Bradford's Ore-Washer.
Fig. 3.
Fig. 4.
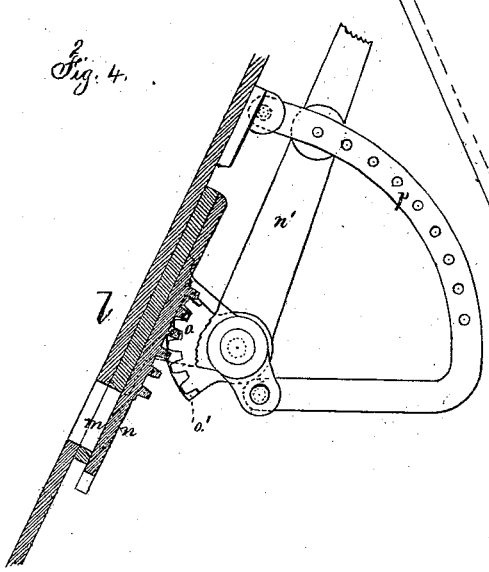
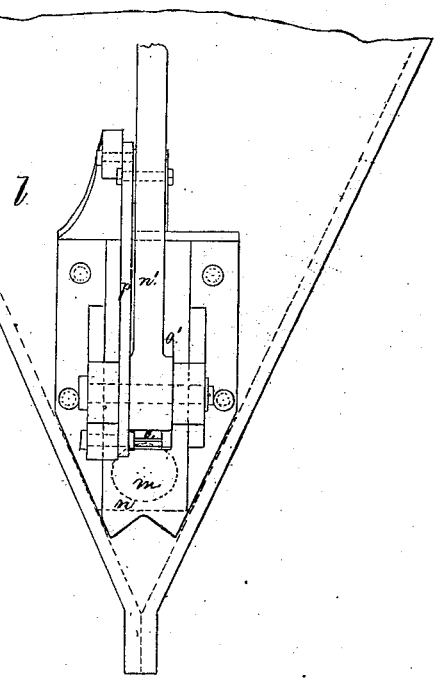
Witnesses.
Chas H Smith
Geo. D. Walker
Hezekiah Bradford Bradford's Ore Washer.

Witnesses
Chas. H. Smith
Geo. D. Walker

Hezekiah Bradford

Bradford's Ore Washer.

Witnesses
Chs. H. Smith
Geo. D. Walker

Hezekiah Bradford

Bradford's Ore Washer

Witness
Chas H Smith
Geo D Walker

Hezekiah Bradford

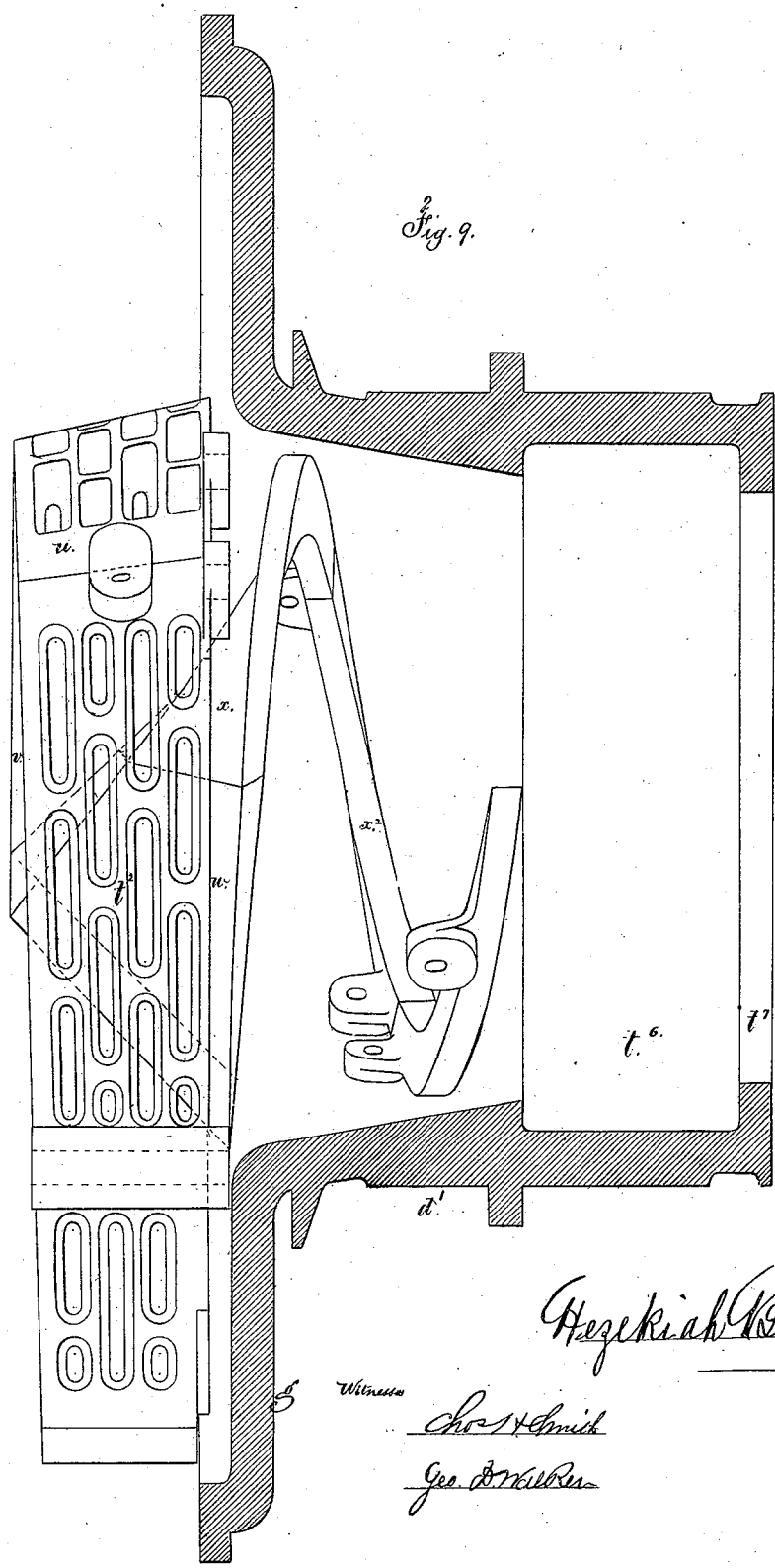

United States Patent Office.

HEZEKIAH BRADFORD, OF READING, PENNSYLVANIA.

Letters Patent No. 108,962, dated November 8, 1870; antedated October 28, 1870.

IMPROVEMENT IN ORE-WASHERS.

The Schedule referred to in these Letters Patent and making part of the same.

*To all whom it may concern:*

Be it known that I, HEZEKIAH BRADFORD, of Reading, in the county of Berks and State of Pennsylvania, have invented an Improvement in Ore-Washers; and the following is hereby declared to be a full, clear, and exact description of the same.

In Letters Patent No. 15,544, granted August 12, 1856, a horizontal cylinder is shown revolving in a water-hopper cistern, said cylinder being perforated, and receiving the ore at one end and discharging it at the other end.

My present invention is an improvement upon the same, whereby the central shaft is dispensed with, giving an unobstructed opening for receiving and delivering the ores.

I also make use of a peculiar character of perforated cylinder, as hereafter set forth, and provide for delivering the water and muddy accumulation in such a manner that the hopper-cistern will be entirely emptied by the contents running off at the point of delivery when the apparatus is stopped, thereby preventing injury to the apparatus in frosty weather by the freezing of water or muddy sediment at the bottom or upon the sides of the trough.

I find, by experiment, that the sides of this trough should be at least sixty degrees of inclination, and the sides smooth, to prevent the earthy materials setting upon the sides, as in the apparatus patented aforesaid, and in some cases more than sixty degrees is required.

In the drawing—

Figure 1:
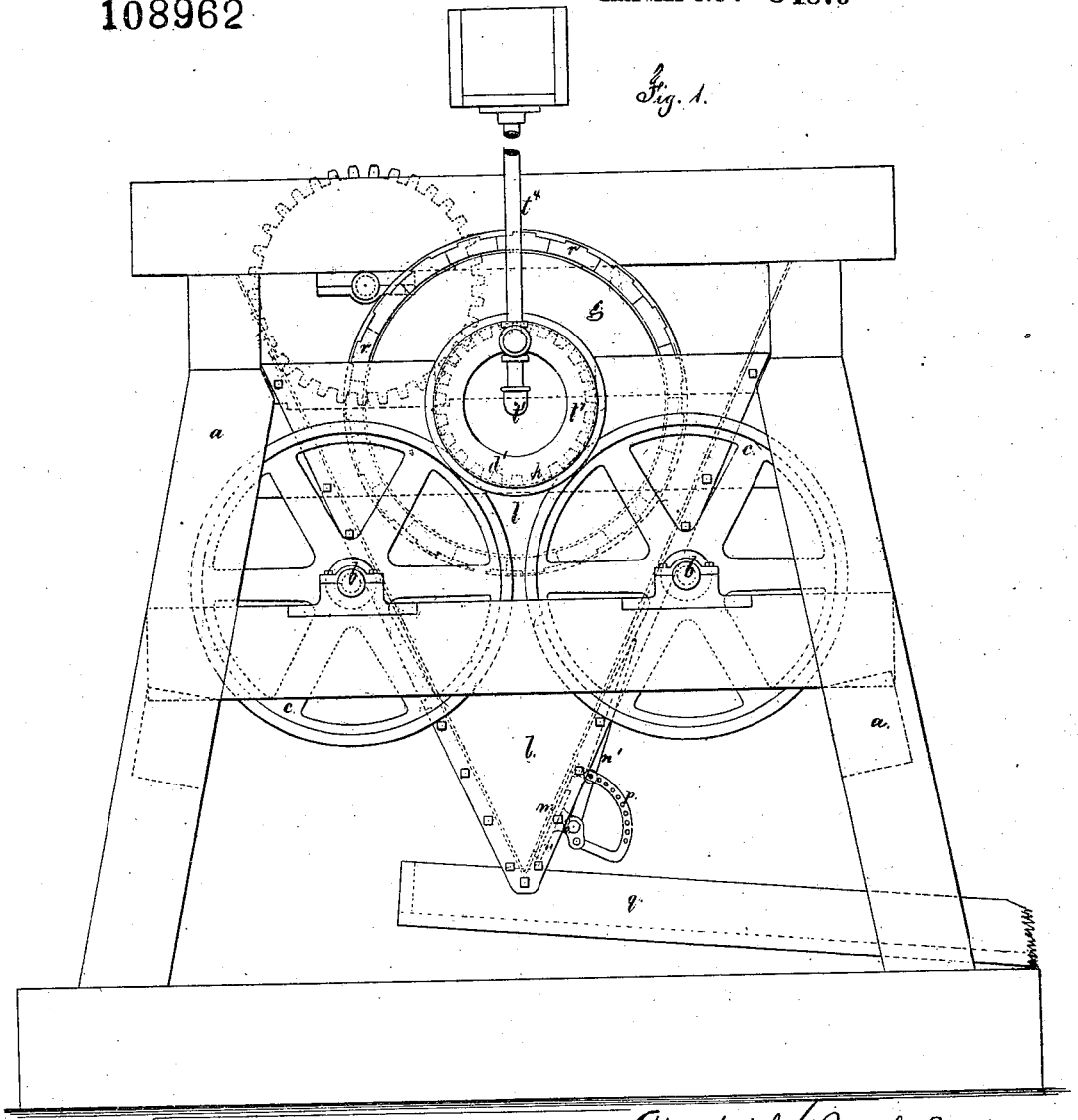
Figure 1 is a view, endwise, of the cylinder.

The frame-work *a* is formed so as to sustain the shafts *b b*, upon which are supporting-wheels *c c*, that sustain the ore-washing cylinder, said wheels acting below the cylindrical necks *d* and *d'*, that project from the heads *f* and *g* of the ore-washing cylinder.

The neck *d* is provided with a gear-wheel around it, as at *h*, so that the ore-washing cylinder may be rotated by power through the pinion *k*.

The ore-washing cylinder being sustained as aforesaid, revolves without much friction, and the bearings are free from grit and foreign substances.

The hopper-shaped cistern for containing water, and in which the ore-washing cylinder revolves, is formed of the sides *l l*, setting up around the necks *d d'*, and extending in the form of an inverted pyramid to the point of delivery at *m*.

The sides of this inverted pyramid should be sufficiently steep to prevent the lodging of sediment, so that all earthy foreign matters subside to the apex of the cone, where they are delivered through the said aperture *m*.

This inclination must depend upon the character of material being washed, so that the earthy material may settle rapidly, and leave the water clearer at top, while a thick muddy accumulation is drawn off at the bottom, thus effecting the washing with as little waste of water as possible; and when work is stopped, the entire contents of the hopper flow away, and there is no muddy accumulation remaining to freeze or clog up the apparatus.

The water has to be supplied to this hopper-shaped cistern, and maintained at the proper level, to wash the contents of the cylinder; hence, if the sediment flows away too fast from the aperture *m* the level of the water becomes too low, and if any particles of ore obstruct said opening the hopper-cistern fills up with sediment, and water rises or overflows.

In consequence of these conditions, great difficulty has been experienced at the delivery-opening *m*, because the slides heretofore employed produced a narrow opening, that became obstructed, when, in consequence of scarcity of water, it was desired to deliver as small a stream of sediment as would prevent it from accumulating in the hopper-cistern.

To overcome this difficulty, I find that it is necessary to maintain as nearly a round opening as possible, to prevent the stoppage of the outlet by pieces of ore or other substances, when the scarcity of water makes it desirable to use as small a quantity as possible.

To effect this, I make use of a slide, *n*, (see the elevation, fig. 3, and section, fig. 4,) which slide is set over the opening *m*, and is formed with an inverted V-shaped notch at its lower edge, so that the stream running from *m* will be of greater or lesser size, according to the position of the slide *n*, and the opening will always be of a nearly circular shape, to allow the free discharge of sediment, the hole *m* being either circular or V-shaped.

The slide *n* is operated by a lever, *n'*, and segmental gear and rack *o*, and the slide is pressed to its place by a sector, *o'*, at the side of the teeth, so that the slide *n* will not become loose in consequence of any wear in the teeth.

A pin in the sector *p* serves to hold the lever *n'* and gate or slide *n* in any position to which it may be adjusted.

A trough, *q*, serves to convey away the water and earthy materials.

The ore-washing cylinder itself is formed of staves *r*, made with perforations through them. Said perforations may be wider at the inner side.

Figure 5:
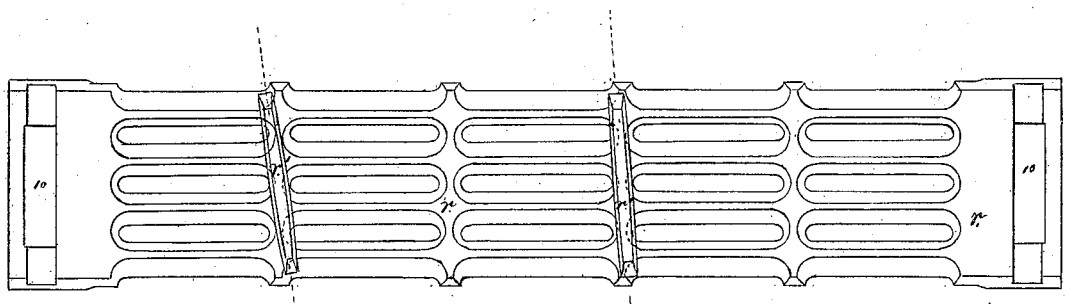

One of these staves is shown separately in fig. 5. These staves should form the section of a cylinder, and the ends of the staves have grooves 10 to receive the edges of the heads *f g*, and the bands 12 13 clamp the said staves firmly to the heads, so as to form a very firm, strong, and rigid cylinder, without the use of a shaft.

Figure 2:
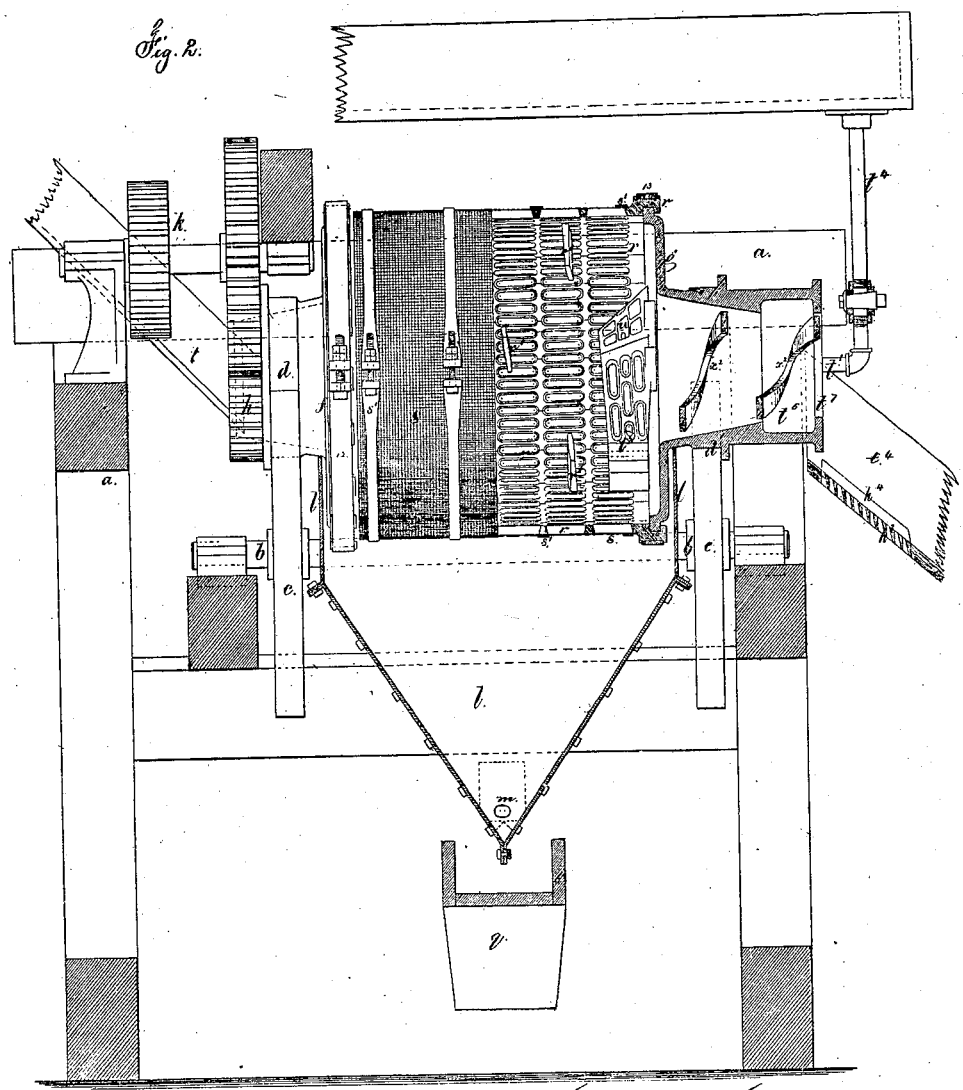
Figure 2 shows a portion of the side of the washing-cylinder, the other parts being represented by a vertical section.

The entire cylinder is surrounded by a wire-cloth or perforated metal screen, shown partially at $s$, fig. 2, the same being retained by the bands $s'$, and the meshes of this screen are of a size to retain the particles of ore or other material of the desired size, and allow smaller particles to pass through, and the staves $r$ support the body of ore and take the wear in the cylinder, and prevent the screen of wire-cloth or other material being rapidly worn out, and the openings in said staves being largest at the inner surface of the stave the ore cannot become wedged in, but the openings will be constantly kept free by the ore dropping back into the cylinder as it revolves by the action of the water in running through the openings on the descending side of the cylinder.

This cylinder and screen might be used where water was not employed. I do not, however, limit myself to the holes being largest at the inner surface of the cylinder.

The staves $r$ have flanges, $r'$, placed at suitable distances apart, pointing inward, and serving to cut up the clay and to separate and agitate the mass of ore, and also to cause it to progress toward the delivery-head $d'$, as said flanges are placed at an inclination, as seen in figs. 2 and 5, to move the ore along as it slides past the flanges.

The inclination of the flanges $r'$ may be more toward the receiving-end of the cylinder than at the delivery-end, so as to keep the ore or other material from accumulating at the receiving-end when there is a thick layer of ore in the middle and delivery-end of the cylinder, as hereafter named.

The ore is supplied by the feeding-trough $t$, through the neck $d$ of the head $f$, and delivered through the neck $d'$, and the water may be supplied by a sprinkler, $t^1$, at this neck $d'$, so as to cleanse the ore thoroughly by washing the muddy water off the ore as it passes out, the water thus used running into the cylinder and hopper-shaped cistern.

Water may also pass in with the ore, if required, to assist in feeding the same, or may be supplied to the hopper-shaped cistern in any other way.

I make use of a perforated lifting inclined volute for taking the ore out of the cylinder. This volute is shown in fig. 2, and by the separate views figs. 6, 7, 8, and 9.

Figure 6:
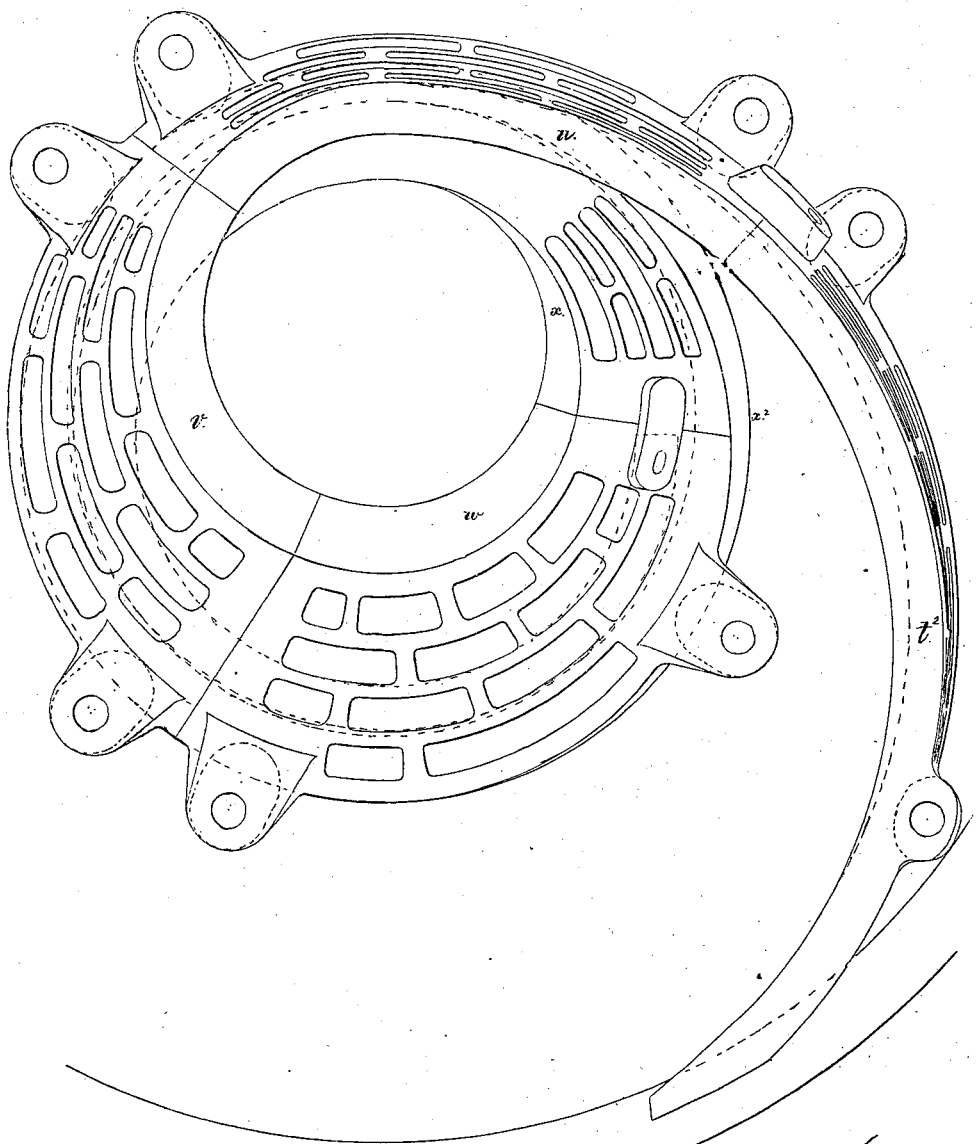

This volute, in fig. 6, is shown with the sections $t^2$, $u$, $v$, $w$, and $x$, forming a compound inclined volute scoop to take up the ore from near the staves, and deliver it out into the neck $d'$, where the screw-flange $x^2$ causes it to be passed out of said neck.

If the ore contains "clay-balls" or other material requiring considerable abrasion or rubbing to dissolve the clay and separate the earthy material, it is important that a larger quantity of material should be in the cylinder under operation, so that the weight of ore and the consequent rubbing or scrubbing of the pieces against each other and against the clay-balls may be more effective in cleaning the ore as it moves slowly through the cylinder.

Figure 8:
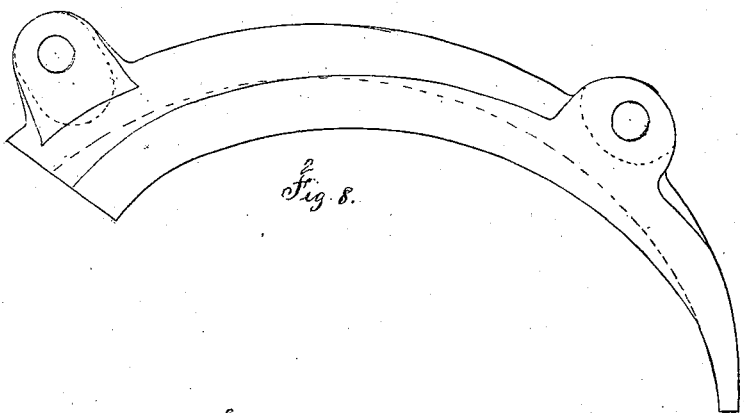
Figure 7:
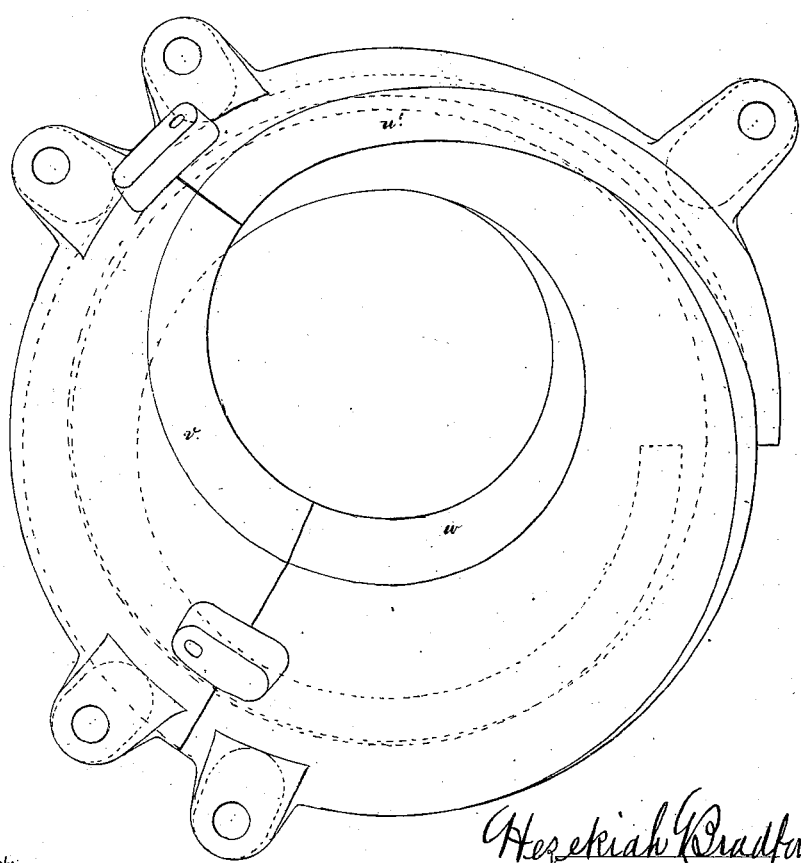

To effect this, section $t^2$ may be taken off, and a shorter section, shown in fig. 8, may be substituted, or both sections $t^2$ and $u$ may be removed, and the short section $u'$, fig. 7, substituted.

This will cause a layer of considerable thickness to be under operation in the cylinder, and in this case the inclined flanges near the supply-end keep the material away from below the feeding-neck, so that said terial may run in freely, even if the ore is banked up at the delivery-end.

The screw $x^2$ in the neck $d'$ is raised slightly from the inner surface of said neck, so that water may run under the same. The water as it is supplied from the pipe $t^4$ and the sprinkler $t^1$, accumulates in the recessed portion $t^6$ of the neck, so that the ore is immersed more or less in fresh water before its final delivery from said neck $d'$ over the internal flange $t^7$, that prevents the water running out at this end, and causes it to run back into the ore-washing cylinder.

The neck $d'$ may be made shorter, and of a cylindrical form, and teeth may be substituted for the screw $x^2$, so as to agitate the ore, and move it during the final washing and delivery over the flange $t^7$, still allowing the water to run back through the cylinder into the hopper-cistern.

Figure 10:
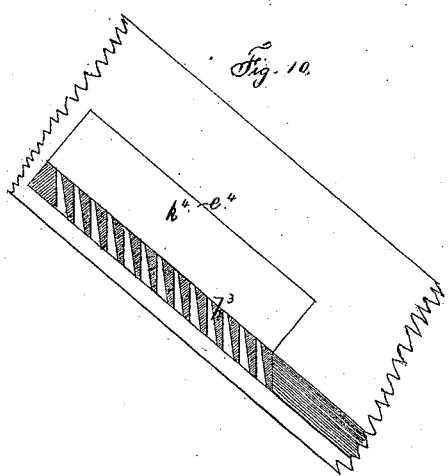
Figure 11:
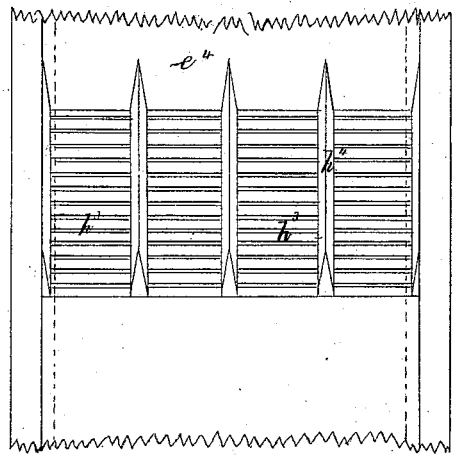

The ore, as delivered, falls into the chute $e^4$, see fig. 2, and the section fig. 10 and elevation fig. 11.

This chute is formed of cross-bars $h^3$, set up vertically, and beveled at the upper surface, the said bars being sustained by the longitudinal plates $h^4$.

Upon these plates $h^4$ the larger pieces of ore are received and slide down. Hence, the bars $h^3$ are not worn and injured by the large lumps, the top edges of the plates $h^4$ being narrow, so that water runs off the upper surface and down the sides of said plates through the bars $h^3$, freeing the ore from the surplus water.

The bars $h^3$ are sufficiently close to prevent the ore or similar material passing between them, and, in consequence of the openings between the bars being vertical, the water from the ore draws away rapidly, there being nothing to prevent the water dropping directly through the opening between the bars as the ore falls upon such bars. Hence, the ore is more thoroughly deprived of the water than would be the case if the openings were at right angles to the inclined surface of the chute.

In place of using the wheels or rollers $c$ $c$, the ore-washing cylinder might be suspended by chains from pulleys upon a shaft placed over the said cylinder; but I prefer the construction shown.

I claim as my invention—

1. The ore-washing cylinder, formed with the heads $f$ and $g$ and necks $d$ $d'$, in combination with the shafts $b$ $b$ and supporting-wheels $c$ $c$, as and for the purposes specified.

2. The hopper-shaped cistern and delivery-opening $m$, in combination with the slide $n$, having a ∧-shaped edge, as and for the purposes specified.

3. The slide $n$, with a ∧-shaped edge, in combination with a cistern, $l$, opening $m$, segment $o'$, and gear-teeth $o$, as specified.

4. The perforated cylinder $r$, formed of staves, in combination with the surrounding screen, substantially as set forth.

5. The removable sections of the perforated inclined lifting-volute, in combination with the ore-washing cylinder, as and for the purposes set forth.

6. The neck $d'$, formed with a recessed interior surface $t^6$, and flange $t^7$, as and for the purposes specified.

7. The inclined chute, formed with bars $h^3$ and intervening vertical openings, combined with the plates or ribs $h^4$, as and for the purposes set forth.

8. The staves $r$, with the flanges $r'$, formed in the manner and for the purposes specified.

9. The staves $r$, made with grooves near the ends for receiving the edges of the heads $f$ $g$, in combination with the clamping-bands 12 13, as and for the purposes specified.

10. The slide $n$, having a ∧-shaped edge, in combination with the opening $m$ of the hopper or vessel, substantially as specified, so as to obtain a variable discharge-opening of the character set forth.

11. The bars $h^3$, set transversely of the chute $e^4$, and having inclined upper surfaces, so that the opening between the bars may be nearly vertical, as and for the purposes specified.

Signed by me this 13th day of April, A. D. 1870.

HEZEKIAH BRADFORD.

Witnesses:
CHAS. H. SMITH,
GEO. T. PINCKNEY.